United States Patent
Kuo

(10) Patent No.: US 8,955,404 B2
(45) Date of Patent: Feb. 17, 2015

(54) BALL SCREW MODULE

(75) Inventor: Chang-Hsin Kuo, Taichung (TW)

(73) Assignee: Hiwin Technologies Corp, Taichung (TW)

( * ) Notice: Subject to any disclaimer, the term of this patent is extended or adjusted under 35 U.S.C. 154(b) by 746 days.

(21) Appl. No.: 13/309,863

(22) Filed: Dec. 2, 2011

(65) Prior Publication Data

US 2012/0073397 A1 Mar. 29, 2012

Related U.S. Application Data

(63) Continuation-in-part of application No. 12/263,548, filed on Nov. 3, 2008, now abandoned.

(51) Int. Cl.
*F16H 25/22* (2006.01)

(52) U.S. Cl.
CPC ........ *F16H 25/2214* (2013.01); *F16H 25/2238* (2013.01)
USPC ..................................... 74/424.86; 74/424.82

(58) Field of Classification Search
CPC ......................... F16H 25/2238; F16H 25/2214
USPC ............... 74/424.82, 424.83, 424.86, 424.87, 74/89.23, 424.7
See application file for complete search history.

(56) References Cited

U.S. PATENT DOCUMENTS

| | | | | |
|---|---|---|---|---|
| 449,964 | A * | 4/1891 | sIMONDS | 384/525 |
| 2,566,421 | A * | 9/1951 | Lapointe | 384/526 |
| 4,148,226 | A * | 4/1979 | Benton | 74/424.87 |
| 5,005,436 | A * | 4/1991 | Brusasco | 74/424.87 |
| 5,492,036 | A * | 2/1996 | Sato | 74/89.36 |
| 5,993,064 | A | 11/1999 | Teramachi et al. | |
| 6,082,210 | A | 7/2000 | Ise | |
| 6,089,117 | A | 7/2000 | Ebina et al. | |
| 6,561,053 | B2 | 5/2003 | Greubel | |
| 6,874,939 | B2 | 4/2005 | Michioka et al. | |
| 7,210,369 | B2 * | 5/2007 | Hartig et al. | 74/424.86 |
| 7,357,048 | B2 * | 4/2008 | Hartig et al. | 74/424.83 |
| 7,523,682 | B2 * | 4/2009 | Liao et al. | 74/424.87 |
| 7,640,820 | B1 * | 1/2010 | West et al. | 74/424.82 |
| 7,908,938 | B2 * | 3/2011 | Chen | 74/424.82 |
| 7,992,461 | B2 * | 8/2011 | Lin et al. | 74/424.86 |
| 8,100,025 | B2 * | 1/2012 | Lin | 74/424.88 |
| 8,272,289 | B2 * | 9/2012 | Teramachi et al. | 74/424.86 |
| 8,336,417 | B2 * | 12/2012 | Hsu et al. | 74/424.88 |

(Continued)

FOREIGN PATENT DOCUMENTS

| | | |
|---|---|---|
| JP | 05027408 | 4/1993 |
| JP | 10318257 | 12/1998 |
| JP | 11002241 | 1/1999 |
| JP | 11051049 A | 2/1999 |

(Continued)

*Primary Examiner* — David M Fenstermacher
(74) *Attorney, Agent, or Firm* — Ming Chow; Sinorica, LLC

(57) ABSTRACT

Disclosed is a ball screw module including a screw shaft, a nut member, a ball connector, and a circulating device mounted on the nut member. A helical rolling track is formed between the screw shaft and the nut member. The circulating device is in communication with the helical rolling track and has a circulating route. The circulating route includes an intermediate route, two connecting routes connecting the intermediate route, and two guiding sidewalls formed at sides of the circulating route. The guiding sidewalls guide the ball connector to twist in a clockwise direction while the ball connector entering and leaving the intermediate route and guide the ball connector to twist in a counterclockwise direction while the ball connector passing the intermediate route.

12 Claims, 8 Drawing Sheets

(56) References Cited

U.S. PATENT DOCUMENTS

| | | | |
|---|---|---|---|
| 8,534,152 B2 * | 9/2013 | Hsu et al. | 74/424.87 |
| 8,746,102 B2 * | 6/2014 | Miyazaki | 74/424.86 |
| 8,813,596 B2 * | 8/2014 | Chen et al. | 74/424.82 |
| 2002/0026844 A1 * | 3/2002 | Fujita | 74/424.86 |

FOREIGN PATENT DOCUMENTS

| | | |
|---|---|---|
| JP | 11223258 | 8/1999 |
| JP | 11270559 | 10/1999 |
| JP | 11294452 | 10/1999 |
| TW | M266376 | 6/2005 |

* cited by examiner

BALL SCREW MODULE

This is a continuation-in-part of U.S. patent application Ser. No. 12/263,548, entitled BALL SCREW MODULE, filed Nov. 3, 2008, now abandoned.

BACKGROUND OF THE INVENTION

1. Field of the Invention

The present invention relates to ball screw modules, and more particularly, to a ball screw module having a circulating device mounted on a nut member thereof.

2. Description of the Prior Art

The operating principles of a conventional ball screw shaft involve providing balls between a screw shaft and a nut member so as to replace the sliding friction transmission of an outdated acme screw shaft (ACME) with ball rolling motion, thereby reducing friction-induced wear and tear greatly and maintaining high efficiency and high preciseness.

Balls are effective in enabling a screw shaft to move smoothly. However, adjacent balls are, in the course of rolling, likely to collide with each other and therefore produce much noise. The collision shortens the service life of the balls and therefore shortens the service life of the screw shaft.

To solve the problems, the prior art disclosed a connector whereby balls are fixed in position. U.S. Pat. No. 5,993,064 further provides an improved ball connector made of resilient material and comprising four belt members for fixing a plurality of balls in position in all directions, and a ball connector capable of bending freely in all directions and yet keeping the respective positions of the balls unchanged, such that the ball connector is applicable to linear sliding and ball screw shafts.

However, a ball screw module requires a circulating route for guiding the balls returning to a spiral-shaped groove so as to travel along a continuous ball track. A ball connector passing the circulating route has to change its direction of movement so as for the ball connector to follow a loop. An improperly designed circulating route is likely to prevent a ball connector from passing a circulating route smoothly and changing direction. Ball connectors disclosed in the prior art tend to sever when twisted and pulled unduly. Referring to FIG. 1, U.S. Pat. No. 5,993,064 taught a ball connector for use with a screw shaft, and taught a nut member having a circulating device disposed therein so as to enable the ball connector to go through a loop. U.S. Pat. No. 5,993,064 failed to teach how to enable the ball connector to pass the circulating device smoothly. In practice, the two lateral sides of a ball connector undergo 3D revolutions while traveling from a spiral track to a circulating device. If angles of a revolving route is not specially designed, a ball connector traveling along the revolving route is likely to have its inner side squeezed and its outer side pulled and therefore sever due to a difference between its inner and outer sides in deformation. Although linear rolling tracks using ball connectors are commercially available, ball screw shafts adopting ball connectors remain unavailable in terms of design and fabrication.

SUMMARY OF THE INVENTION

To solve the aforesaid problems, it is the primary objective of the present invention to provide a ball screw module having a ball connector moving smoothly in a nut member so as to achieve high performance and high preciseness of the ball screw module.

Another objective of the present invention is to provide a ball screw module having a nut member with a circulating device mounted on the nut member and configured to move a ball connector along a continuous circulating route.

The circulating device of the present invention includes at least a guiding sidewall and preferably two guiding sidewalls for guiding a ball connector to move smoothly. Each of the guiding sidewalls has its partial length along the circulating route being substantially equal to the length of the center line of the circulating route such that the ball connector would not being pushed or dragged while the ball connector passing a turning portion of the circulating route. In other words, the present invention allows the ball connector to move smoothly without being dragged or pushed unduly.

A ball screw module of the present invention includes a screw shaft, a nut member, a ball connector, and a circulating device. The screw shaft has an outer surface formed with a first helical rolling groove. The nut member is circumferentially disposed around the screw shaft and has an inner surface formed with a second helical rolling groove in position corresponding to the first helical rolling groove. The first and second helical rolling grooves together form a helical rolling track. The helical rolling track enables the ball connector to move therein in a helical direction. The ball connector includes a plurality of balls and a retainer for carrying the balls. The retainer is formed with a plurality of intervals for spacing apart the balls and formed with a first linking strap and a second linking strap for connecting the intervals in series. The balls are fixed in position and spaced apart from each other by the intervals. The first linking strap and the second linking strap are spaced apart from each other by a distance to allow the balls to be steadily positioned between the intervals, the first linking strap, and the second linking strap. The circulating device is mounted on the nut member and formed with a circulating route with two ends thereof in communication with the helical rolling track. The circulating route has a width slightly greater than and substantially equal to the diameter of each of the balls so as to enable the ball connector to pass the circulating route. The circulating route includes an intermediate route and two connecting routes each connecting the helical rolling track with an end of the intermediate route. The circulating route is formed with two guiding sidewalls for guiding the linking straps of the ball connector. As disclosed in the present invention, the guiding sidewalls are configured on basis of a three-dimensional layout to guide the ball connector to twist in a first rotational direction while the ball connector moving from one of the connecting routes to the intermediate route and from the intermediate route to the other one of the connecting routes, and to guide the ball connector to twist in a second rotational direction while the ball connector passing through the intermediate route. The first rotational direction is opposite to the second rotational direction.

The ball connector moves in the sequence "connecting route-intermediate route-connecting route" so as to go through all the turning portions of the circulating route smoothly.

Compared to the prior art, the present invention has the following advantages. A circulating device of a ball screw module of the present invention is equipped with special guiding sidewalls configured to be tilted toward a lower position or a higher position at a portion that is near the curved parts of the connecting routes of the circulating route so as to guide a ball connector to go through turning portions of the circulating route and therefore complete a circulation. Accordingly, each guiding sidewall has it length along the circulating route being substantially equal to the length of the center line of the circulating route and thus prevents linking straps of the ball connector from being dragged or pushed unduly while the ball connector passing the circulating route.

BRIEF DESCRIPTION OF THE DRAWINGS

The invention as well as a preferred mode of use, further objectives and advantages thereof, will best be understood with reference to the following detailed description of an illustrative embodiment when read in conjunction with the accompanying drawings, wherein.

DETAILED DESCRIPTION OF THE EMBODIMENTS

Figure 1:
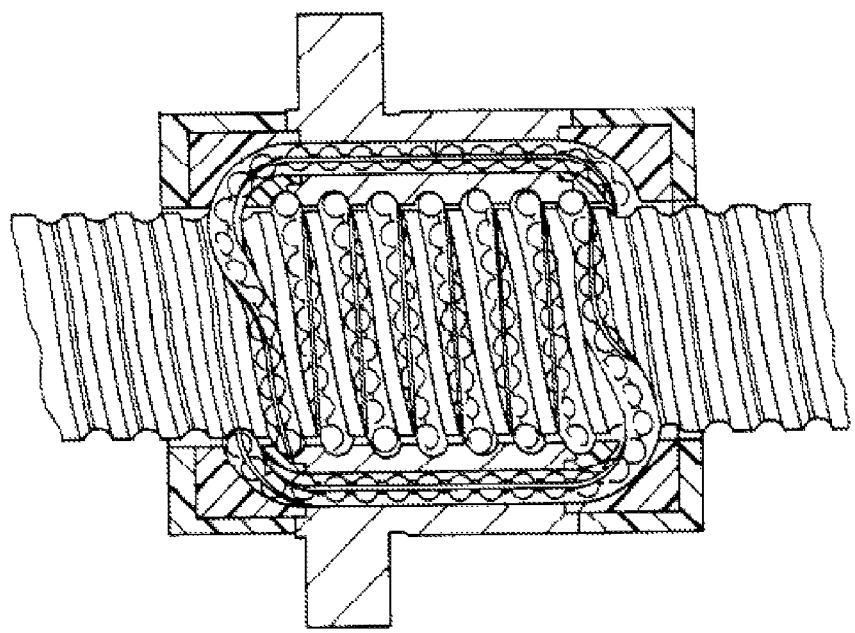
FIG. 1 is a cross-sectional view of a ball screw module and a ball connector thereof according to the prior art.
Figure 2:
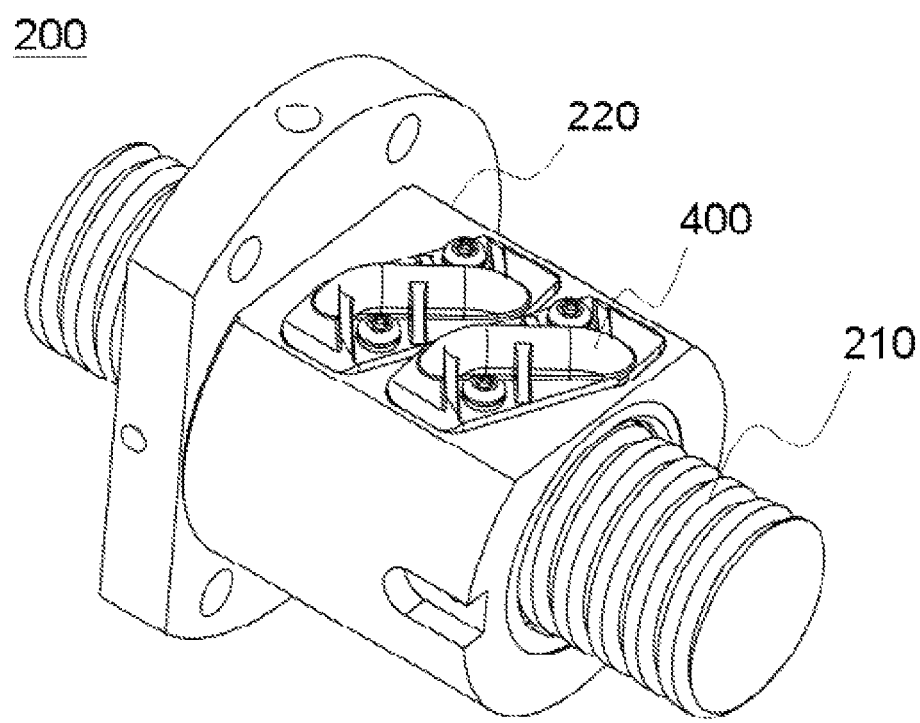
FIG. 2 is a perspective view of a nut member and a screw shaft of the ball screw module according to a first embodiment of the present invention.

The modes for carrying out the present invention will be described with reference to the following embodiments and the accompanying drawings. The generally related principles for mechanically driving a ball screw module are known to persons ordinarily skilled in the art and will not be described in detail hereunder. Moreover, the accompanying drawings are illustrated in a schematic manner and for exemplification only.

Referring to FIGS. 2, 3, 4 and 5, a ball screw module 200 according to a first embodiment of the present invention includes a screw shaft 210, a nut member 220, a ball connector 300, and two circulating devices 400. The screw shaft 210 has an outer surface formed with a first helical rolling groove 212 for loading the ball connector 300. The nut member 220 is circumferentially disposed around the screw shaft 210 and has an inner surface formed with a second helical rolling groove 222 in position corresponding to the first helical rolling groove 212 for loading the ball connector 300. The first helical rolling groove 212 and the second helical rolling groove 222 together form a helical rolling track 230 to accommodate the ball connector 300 and enable the helical movement of the ball connector 300.

Figure 3:
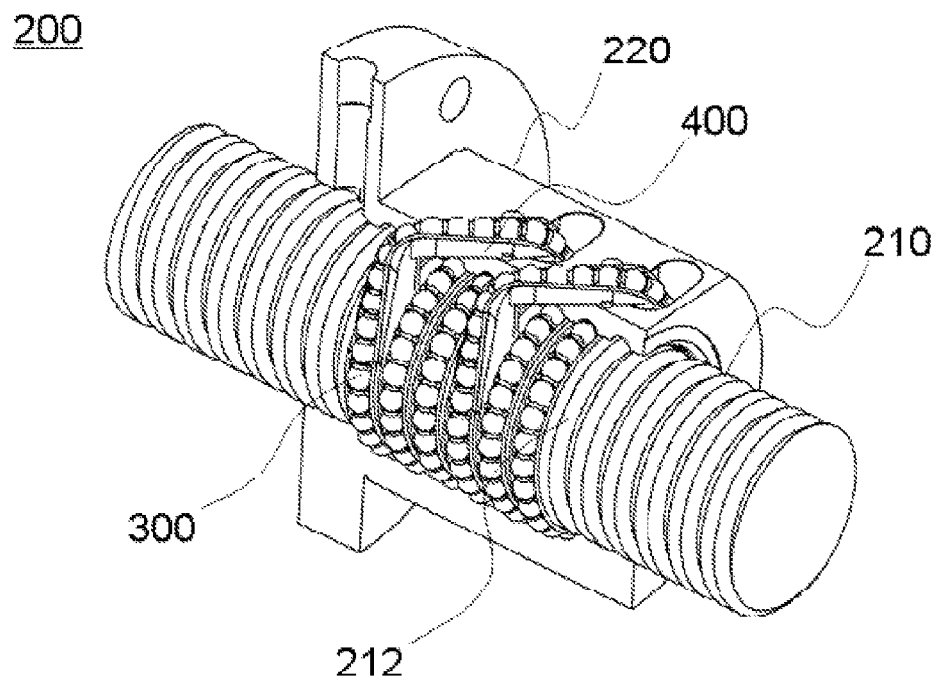
FIG. 3 is a cross-sectional view of a ball screw module, a ball connector thereof, and a circulating device thereof according to the first embodiment of the present invention.
Figure 4:
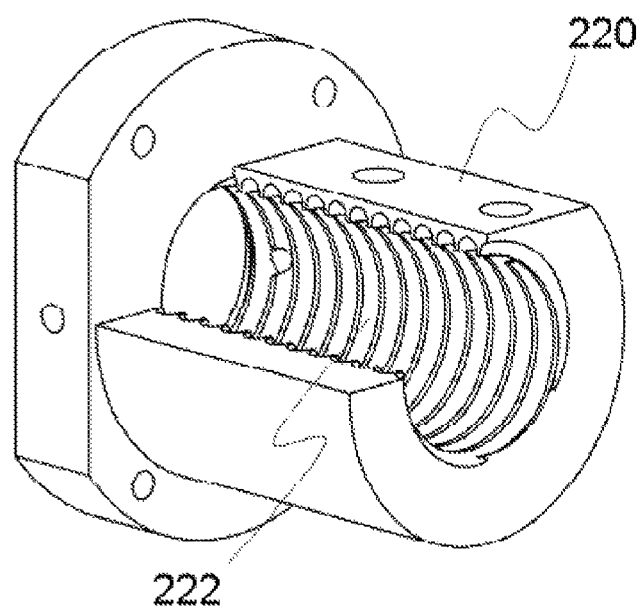
FIG. 4 is a cross-sectional view of a second helical rolling groove on the inner surface of the nut member of the ball screw module according to the first embodiment of the present invention.
Figure 7:
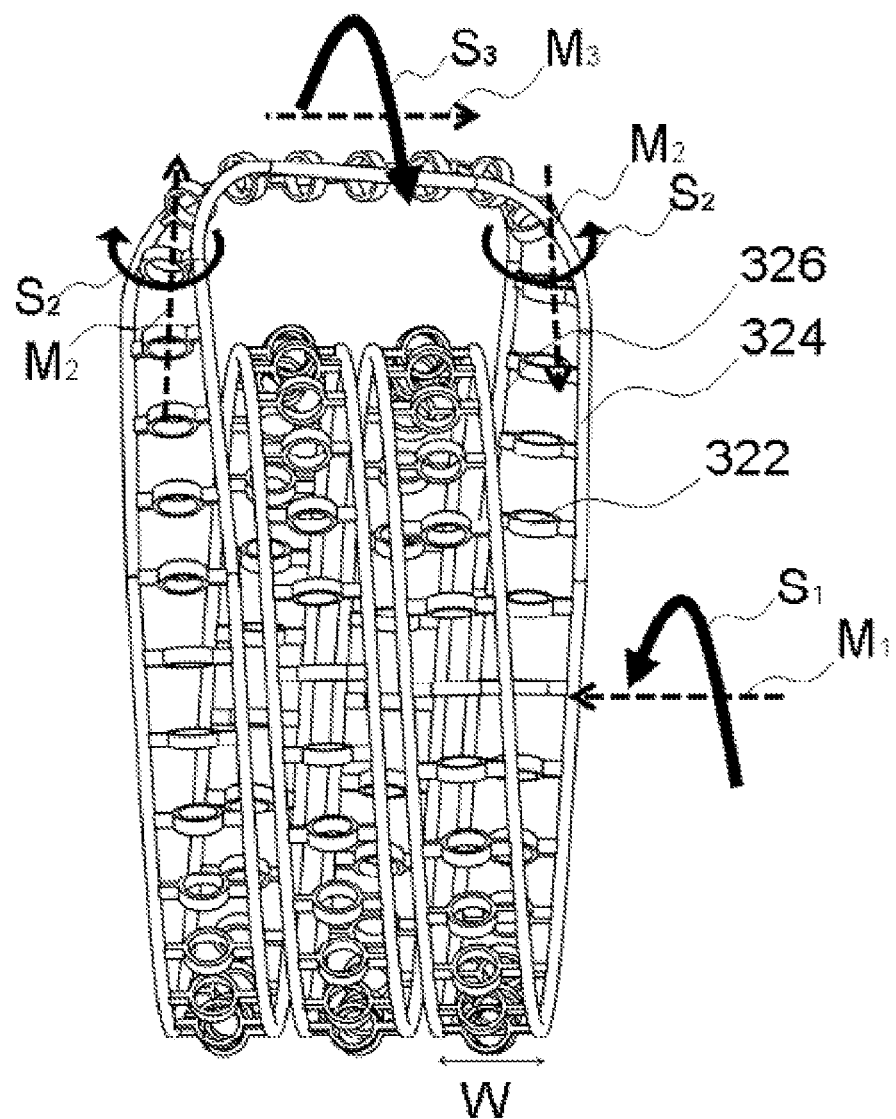
FIG. 7 is a perspective view of a retainer of the ball connector of the ball screw module and the direction in which the linking straps twist in a circulating route according to the first embodiment of the present invention.

Referring to FIGS. 3 and 7, the helical rolling track 230 guides the ball connector 300 to move in a helical direction with a counterclockwise rotational direction S1 in a view taken from the head of the moving direction M1 of the ball connector 300 and therefore allows the nut member 220 to rotate in a clockwise direction and move in a direction parallel with the axis of the screw shaft 210.

Figure 5:
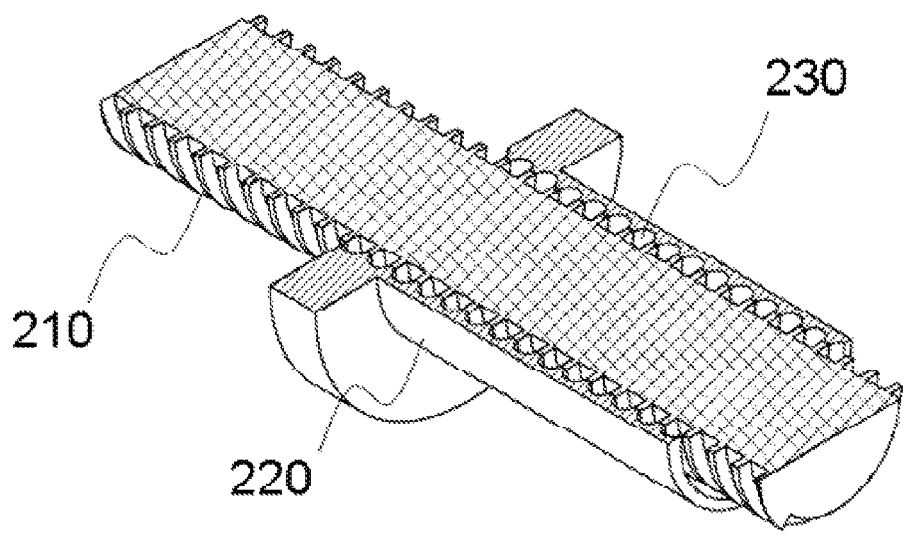
FIG. 5 is a cross-sectional view of a helical rolling track of the ball screw module according to the first embodiment of the present invention.
Figure 6:
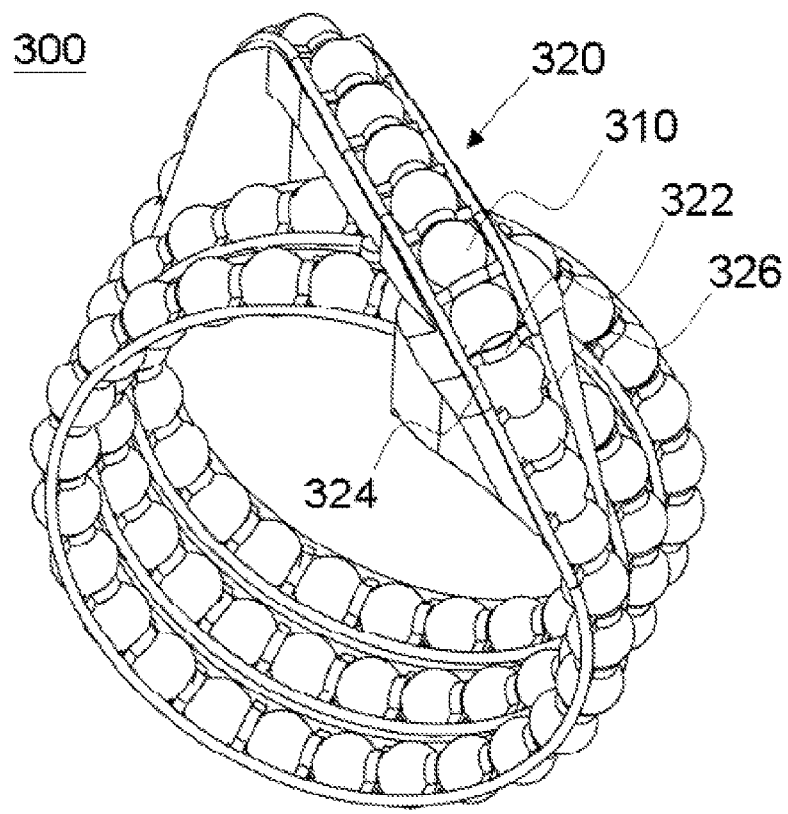
FIG. 6 is a perspective view of the ball connector of the ball screw module according to the first embodiment of the present invention.

Referring to FIGS. 5, 6 and 7, the ball connector 300 according to the first embodiment of the invention includes a plurality of balls 310 and a retainer 320 for carrying the balls 310. The retainer 320 is formed with a plurality of intervals 322 for spacing apart the balls 310 and with a first linking strap 324 and a second linking strap 326 for connecting the intervals 322 in series. The linking straps 324 and 326 are well designed to be disposed between the outer surface of the screw shaft 210 and the inner surface of the nut member 220 and therefore be allowed to move along the sidewalls of the helical rolling track 230. In this way, no extra spaces on the screw shaft 210 or the nut member 220 would be needed for receiving the linking straps 324 and 326 in motion. The first linking strap 324 and the second linking strap 326 are spaced apart from each other by a distance W. The distance W is substantially equal to the diameter of each of the balls 310 such that the balls 310 could be steadily positioned between the intervals 322, the first linking strap 324, and the second linking strap 326. As a result, the retainer 320 and the balls 310 together facilitate the movement of the ball connector 300 within the helical rolling track 230. For the purpose of obtaining precise transmission of the ball screw module 200, it is preferable that the helical rolling track 230 has a cross-section with a diameter being substantially equal to the diameter of each of the balls 310.

Figure 8A:
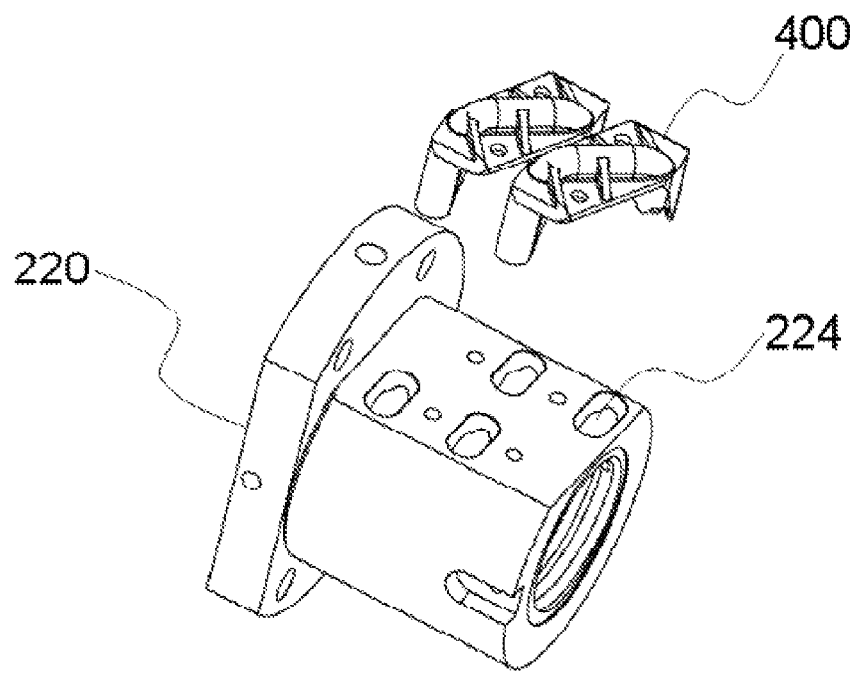
FIG. 8A is a perspective view of the nut member and the circulating device of the ball screw module according to a second embodiment of the present invention.
Figure 8B:
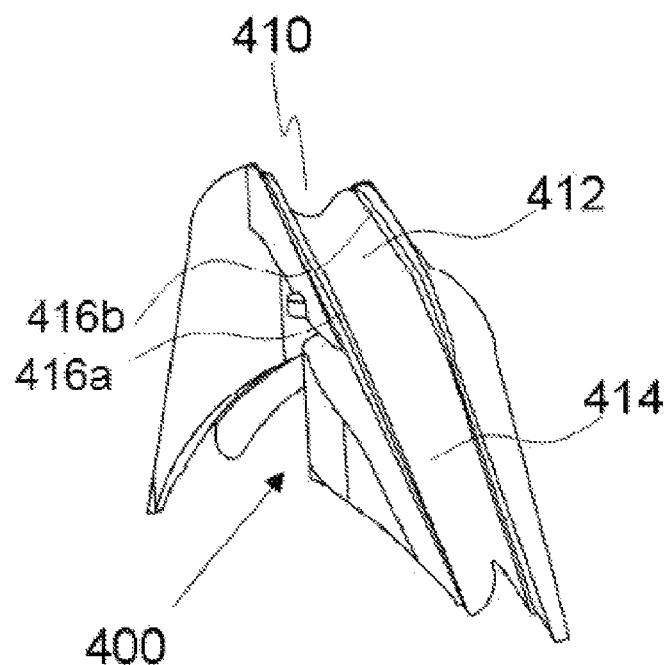
FIG. 8B is a schematic drawing showing the lower half of the circulating device of the ball screw module according to the present invention.
Figure 8C:
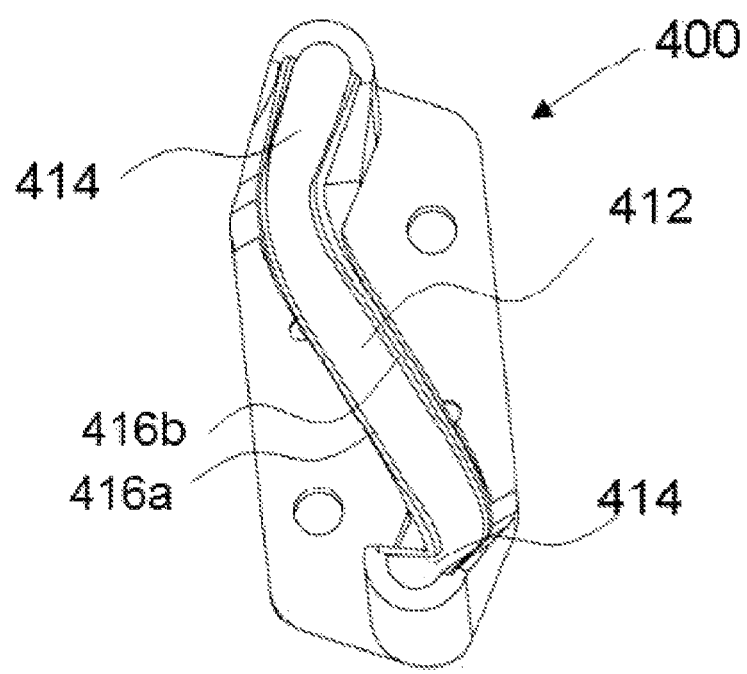
FIG. 8C is a schematic drawing showing the upper half of the circulating device of the ball screw module according to the present invention, taken from an upward perspective view point.

Referring to FIGS. 3, 5, 8A, 8B, and 8C, the ball screw module 200 according to the first embodiment is further provided with two circulating devices 400 mounted on the nut member 220. Each of the circulating devices 400 is formed with a circulating route 410 to communicate with the helical rolling track 230 and thereby form a continuous route for the movement of the ball connector 300. Preferably, the circulating route 410 has a width slightly greater than and substantially equal to the diameter of each of the balls 310. Referring to FIGS. 8B and 8C, the circulating route 410 includes an intermediate route 412 and two connecting routes 414a and 414b. The connecting route 414a connects the helical rolling track 230 with one end of the intermediate route 412 while the connecting route 414b connects the other end of the intermediate route 412 with the helical rolling track 230. The intermediate route 412 is substantially straight while each of the connecting routes 414a and 414b is partially curved. Referring to FIG. 3, the center line of the intermediate route 412 and the axis of the screw shaft 210 are skewed with respect to each other without intersection.

Referring again to FIGS. 8B and 8C, the circulating route 410 is formed with two guiding sidewalls 416a and 416b for guiding the first linking strap 324 and the second linking strap 326 of the ball connector 300, respectively. Each of the guiding sidewalls 416a and 416b is partially curved along the connecting routes 414a and 414b. Moreover, in a three-dimensional point of view, the guiding sidewalls 416a and 416b are configured in a manner that each of the guiding sidewalls 416a and 416b is tilted toward a lower position at a portion that is near the curved parts of the connecting routes 414a and 414b and has a length longer than that of the center line of the circulating route 410 while each of the guiding sidewalls 416a and 416b is tilted toward a higher position at a portion that is near the curved parts of the connecting routes 414a and 414b and has a length shorter than that of the center line of the circulating route 410. In this way, each of the guiding sidewalls 416a and 416b has its partial length along the circulating route 410 being substantially equal to the length of the center line of the circulating route 410, and the ball connector 300 is able to smoothly pass the circulating route 410. Accordingly, the present invention discloses a three-dimensional adjustment for the length of the two guiding sidewalls 416a and 416b.

Referring to FIGS. 3, 5, 6, 7, 8B, and 8C, the ball connector 300 is guided to move from the helical rolling track 230 to the circulating devices 400 and then return to the helical rolling track 230. Specifically, the guiding sidewalls 416a and 416b guide the linking straps 324 and 326 of the ball connector 300 to twist and therefore to change the direction of movement of the ball connector 300 such that the ball connector 300 travels from the helical rolling track 230 to the circulating route 410 and then back to the helical rolling track 230. Further detailed description is as follows.

Referring to FIGS. 3, 6 and 7, the configuration of the guiding sidewalls 416a and 416b enables the linking straps 324 and 326 of the ball connector 300 to twist in a clockwise direction S2 in a view taken from the head of the moving direction M2 of the ball connector 300 entering the connecting route 414a while the guiding sidewalls 416a and 416b guiding the ball connector 300 to move from the connecting route 414a to the intermediate route 412. Subsequently, the configuration of the guiding sidewalls 416a and 416b continue to enable the linking straps 324 and 326 of the ball connector 300 to twist in a counterclockwise direction S3 in a view taken from the head of the moving direction M3 of the ball connector 300 passing the intermediate route 412 while the guiding sidewalls 416a and 416b guiding the ball connector 300 to pass the intermediate route 412. Finally, the configuration of the guiding sidewalls 416a and 416b enable the linking straps 324 and 326 of the ball connector 300 to twist again in the clockwise direction S2 in a view taken from the head of the moving direction M4 of the ball connector 300 entering the connecting route 414b while the guiding sidewalls 416a and 416b guiding the ball connector 300 to move from the intermediate route 412 to the connecting route 414b.

The ball connector 300 of the ball screw module 200 is configured to carry the balls 310 and space apart the balls 310 with the intervals 322 by a fixed distance so as to prevent the balls in motions from colliding with each other, thereby prolonging the service life the balls 310. In addition, the ball connector 300 changes its own direction owing to the guiding sidewalls 416a and 416b formed in the circulating device 400 while the ball connector 300 traveling along a specific route within the circulating device 400, which thereby allows the ball connector 300 to move within the circulating device 400 and the helical rolling track 230 continuously. Since the length of the guiding sidewalls 416a and 416b flanking the ball connector 300 are equal and substantially equal to the length of the center line of the circulating route, the first linking strap 324 and the second linking strap 326 of the ball connector 300 are unlikely to be dragged or pushed unduly in the turning sections of the circulating route 410 and the ball connector 300 smoothly and efficiently moves within the circulating route 410 and the helical rolling track 230 of the ball screw module 200 as a result.

Referring to FIGS. 8A, 8B, and 8C, a ball screw module according to a second embodiment of the present invention includes two circulating devices 400 and one nut member 220. The circulating devices 400 are mounted on the nut member 220. In the second embodiment, the nut member 220 is formed with a plurality of through holes 224 for mounting and holding the circulating devices 400 in position, and especially for fixing a portion of the circulating devices 400 in position outside the nut member 220. Each of the circulating devices 400 has a circulating route 410. The circulating route 410 includes an intermediate route 412 and two connecting routes 414 respectively connecting two ends of the intermediate route 412. Two guiding sidewalls 416a and 416b are formed along and at the sides of the intermediate route 412 and the connecting routes 414. The essential features of the circulating devices 400 according to the second embodiment are the same as that of the circulating devices 400 according to the first embodiment.

Figure 9A:
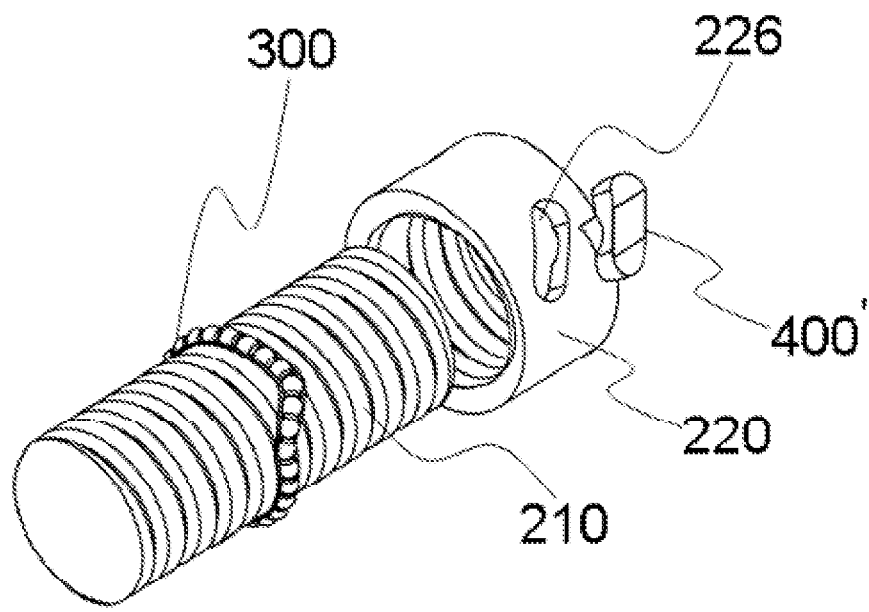
FIG. 9A is an exploded view of the internal-circulating ball screw module according to a third embodiment of the present invention.
Figure 9B:
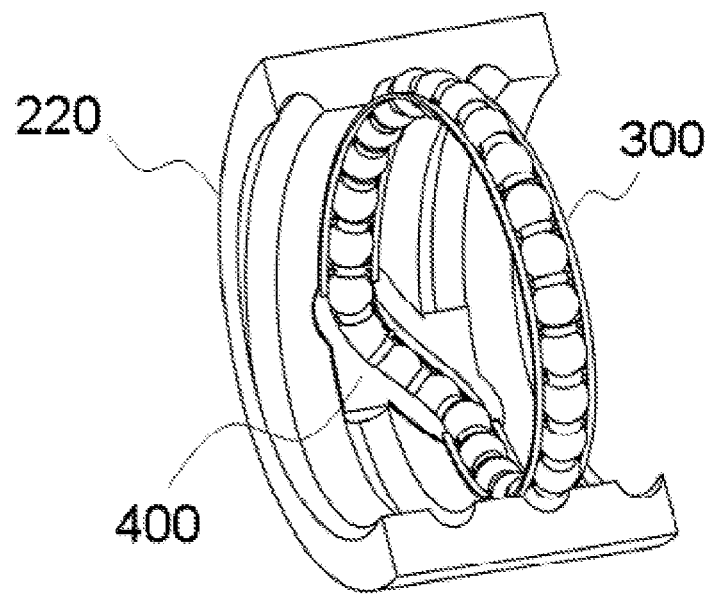
FIG. 9B is a schematic drawing showing the assembly of the ball connector, the circulating device, and the inside of the nut member of the internal-circulating ball screw module according to the third embodiment of the present invention.

Referring to FIGS. 9A and 9B, a ball screw module according to a third embodiment of the present invention is an internal-circulating ball screw module that includes a nut member 220 and a circulating device 400' to be embedded within the nut member 220. In the third embodiment, the inner surface of the nut member 220 is formed with a through hole 226 to accommodate the circulating device 400'. The essential features of the circulating device 400' according to the third embodiment are the same as that of the circulating devices 400 according to the first embodiment.

Figure 10A:
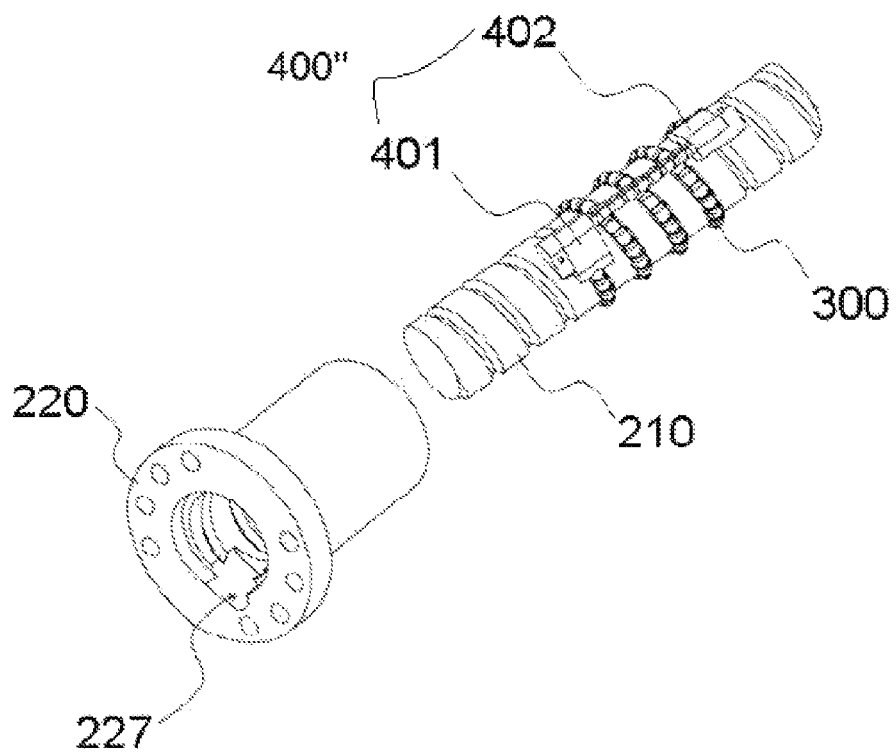
FIG. 10A is an exploded view of the circulating component-style ball screw module according to a fourth embodiment of the present invention.
Figure 10B:
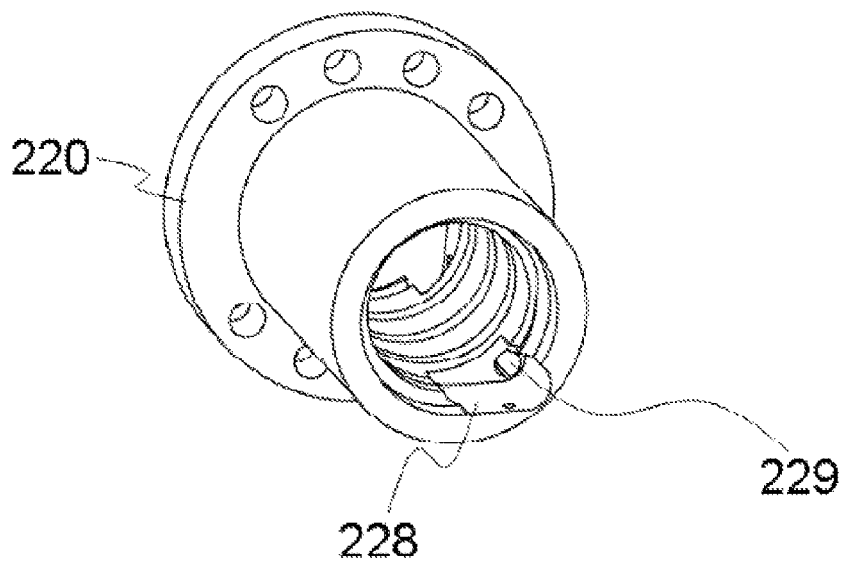
FIG. 10B is a schematic drawing showing the inner structure of the nut member of the circulating component-style ball screw module according to the fourth embodiment of the present invention.

Referring to FIGS. 10A and 10B, a ball screw module according to a fourth embodiment of the present invention is a circulating component-style ball screw module that includes a circulating device 400" and a nut member 220. The nut member 220 is formed with two slots 227 and 228 at two ends inside the nut member 220 and a through hole 229 in communication with the slots 227 and 228. The circulating device 400" includes two circulating components 401 and 402 to be disposed within the two slots 227 and 228, respectively. Each of the circulating components 401 and 402 has a connecting route formed inside while the through hole 229 has an intermediate route formed inside such that the connecting route and the intermediate route are in communication for the movement of a ball connector 300. The essential features of the connecting routes of the circulating device 400" and the intermediate route of the through hole 229 according to the fourth embodiment are the same as that according to the first embodiment.

The foregoing specific embodiments are to illustrate the features and functions of the present invention but are not intended to restrict the scope of the present invention. It is apparent to those skilled in the art that all equivalent modifications and variations made to alternate the foregoing embodiment according to the spirit and principle in the disclosure of the present invention should fall within the scope of the appended claims.

The invention claimed is:

1. A ball screw module, comprising:
   a screw shaft having an outer surface formed with a first helical rolling groove;
   a nut member being circumferentially disposed around the screw shaft and having an inner surface formed with a second helical rolling groove in position corresponding to the first helical rolling groove, the first helical rolling groove and the second helical rolling groove together forming a helical rolling track;
   a ball connector having a plurality of balls and a retainer formed with a plurality of intervals for spacing apart the balls and with linking straps for connecting the intervals in series; and
   a circulating device mounted on the nut member and formed with a circulating route;
   wherein the helical rolling track and the circulating route enable the movement of the ball connector, the circulating route has an intermediate route and connecting routes each connecting the helical rolling track with an end of the intermediate route, the circulating route is formed with two guiding sidewalls for guiding the ball connector to twist in a first rotational direction while the ball connector moving from one of the connecting routes to the intermediate route and from the intermediate route to the other one of the connecting route and to guide the ball connector to twist in a second rotational direction while the ball connector passing through the intermediate route, and the first rotational direction is opposite to the second rotational direction.

2. The ball screw module of claim 1, wherein the intermediate route is substantially straight.

3. The ball screw module of claim 2, wherein a center line of the intermediate route and an axis of the screw shaft are skewed with respect to each other without intersection.

4. The ball screw module of claim 1, wherein the helical rolling track has a cross-sectional with a diameter being substantially equal to the diameter of one of the balls.

5. The ball screw module of claim 1, wherein the circulating route has a width slightly greater than and substantially equal to the diameter of each of the balls.

6. The ball screw module of claim 1, wherein each of the guiding sidewalls has its partial length along the circulating route being substantially equal to the length of the center line of the circulating route.

7. The ball screw module of claim 1, wherein the nut member further has a plurality of through holes for mounting and holding the circulating devices in position outside the nut member.

8. The ball screw module of claim 1, wherein the inner surface of the nut member further formed with a through hole to dispose the circulating device.

9. The ball screw module of claim 1, wherein the nut member is formed with two slots at two ends inside the nut member and a through hole in communication with the slots.

10. The ball screw module of claim 9, wherein the circulating device includes two circulating components respectively disposed in the slots.

11. The ball screw module of claim 10, wherein the intermediate route is formed inside the through hole and the connecting routes are respectively formed inside the circulating components.

12. The ball screw module of claim 1, wherein the linking straps are disposed between the outer surface of the screw shaft and the inner surface of the nut member and the linking straps move along sidewalls of the helical rolling track.

* * * * *